United States Patent
Blok et al.

(10) Patent No.: US 10,583,692 B2
(45) Date of Patent: Mar. 10, 2020

(54) CHAIN END FUNCTIONALIZED POLYOLEFINS FOR IMPROVING WET TRACTION AND ROLLING RESISTANCE OF TIRE TREADS

(71) Applicant: ExxonMobil Chemical Patents Inc., Baytown, TX (US)

(72) Inventors: Edward J. Blok, Huffman, TX (US); Yong Yang, Kingwood, TX (US); Jingwen Zhang, Houston, TX (US); Ian C. Stewart, Houston, TX (US); Shuji Luo, Basking Ridge, NJ (US); Andy H. Tsou, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 143 days.

(21) Appl. No.: 15/513,414

(22) PCT Filed: Oct. 7, 2015

(86) PCT No.: PCT/US2015/054425
§ 371 (c)(1),
(2) Date: Mar. 22, 2017

(87) PCT Pub. No.: WO2016/093934
PCT Pub. Date: Jun. 16, 2016

(65) Prior Publication Data
US 2019/0092098 A1 Mar. 28, 2019

Related U.S. Application Data

(60) Provisional application No. 62/068,043, filed on Oct. 24, 2014.

(30) Foreign Application Priority Data

Nov. 25, 2014 (EP) .................................. 14194809

(51) Int. Cl.
| | | |
|---|---|---|
| *B60C 1/00* | (2006.01) | |
| *C08L 9/06* | (2006.01) | |
| *B60C 11/00* | (2006.01) | |
| *C08F 8/32* | (2006.01) | |
| *C08F 8/42* | (2006.01) | |

(52) U.S. Cl.
CPC ........ *B60C 1/0016* (2013.01); *B60C 11/0008* (2013.01); *C08F 8/32* (2013.01); *C08F 8/42* (2013.01); *C08L 9/06* (2013.01); *B60C 2011/0025* (2013.01); *C08F 2810/40* (2013.01); *C08L 2205/03* (2013.01)

(58) Field of Classification Search
CPC .............. B60C 1/0016; B60C 11/0008; B60C 2011/0025; C08L 9/06; C08L 2205/03; C08F 8/32; C08F 8/42; C08F 2810/40
USPC ........................................................ 524/528
See application file for complete search history.

(56) References Cited

U.S. PATENT DOCUMENTS

| | | | |
|---|---|---|---|
| 5,973,053 A | 10/1999 | Usuki et al. | |
| 6,054,549 A * | 4/2000 | Bahadur ................... | C08F 8/14 524/464 |
| 6,121,379 A * | 9/2000 | Yamanaka ................ | C08F 8/42 524/848 |
| 2003/0130401 A1* | 7/2003 | Lin ......................... | C08L 21/00 524/492 |
| 2005/0014905 A1 | 1/2005 | Chung et al. | |
| 2006/0128868 A1* | 6/2006 | Martter ................... | C08K 5/544 524/492 |
| 2011/0048536 A1 | 3/2011 | Rivard et al. | |
| 2012/0171140 A1 | 7/2012 | Bui et al. | |
| 2012/0245293 A1 | 9/2012 | Crowther et al. | |
| 2012/0245300 A1 | 9/2012 | Crowther et al. | |
| 2014/0088264 A1 | 3/2014 | Crowther et al. | |
| 2014/0121316 A1 | 5/2014 | Monsallier et al. | |
| 2014/0275433 A1 | 9/2014 | Ng et al. | |
| 2016/0145361 A1 | 5/2016 | Tsou et al. | |
| 2016/0222187 A1 | 8/2016 | Luo et al. | |

FOREIGN PATENT DOCUMENTS

| | | |
|---|---|---|
| EP | 1 008 464 | 6/2000 |
| EP | 1 493 765 | 1/2005 |
| JP | 63-275664 A | 11/1988 |
| JP | 2002012709 A | 1/2002 |
| JP | 2010070673 A | 3/2010 |
| WO | 2012/134716 | 10/2012 |
| WO | 2013/116196 | 8/2013 |

OTHER PUBLICATIONS

U.S. Appl. No. 61/704,611, filed Sep. 24, 2012, Kulkarni et al.
U.S. Appl. No. 61/704,725, filed Sep. 24, 2012, Crowther et al.
U.S. Appl. No. 61/860,407, filed Jul. 31, 2013, Tsou et al.
U.S. Appl. No. 61/866,702, filed Aug. 16, 2013, Blok et al.

* cited by examiner

*Primary Examiner* — Michael Bernshteyn

(57) ABSTRACT

A functionalized polyolefin and a tire tread composition comprising the functionalized polyolefin is described. The functionalized polyolefin comprises a vinyl/vinylidene-terminated polyolefin in which the vinyl/vinylidene terminus is functionalized with an alkoxysilane or an alkylsilane and optionally having ether, hydroxyl and/or amine functionality. The invention is also directed to the synthesis of vinyl/vinylidene-terminated polyolefins, functionalization at the vinyl/vinylidene terminus with an alkoxysilane or an alkylsilane and optionally having ether, hydroxyl and/or amine functionality.

10 Claims, 1 Drawing Sheet

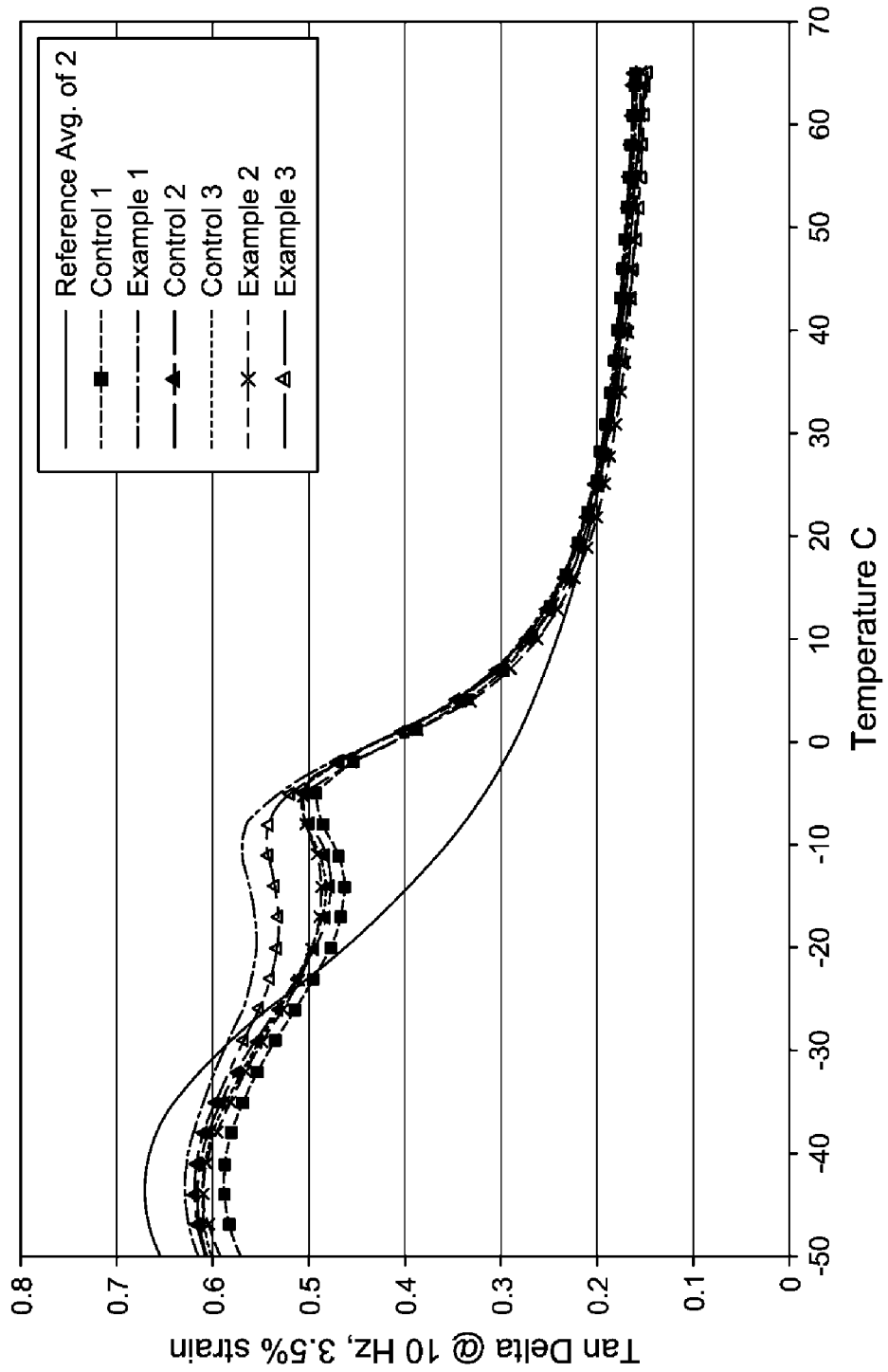

CHAIN END FUNCTIONALIZED POLYOLEFINS FOR IMPROVING WET TRACTION AND ROLLING RESISTANCE OF TIRE TREADS

CROSS REFERENCE TO RELATED APPLICATIONS

This present invention is a National Stage Application of International Application No. PCT/US2015/054425 filed Oct. 7, 2015, which claims priority to and the benefit of U.S. Ser. No. 62/068,043, filed Oct. 24, 2014, and EP application 14194809.1, filed Nov. 25, 2014, and is related to U.S. Ser. No. 62/110,755 filed Feb. 2, 2015, and U.S. Ser. No. 62/083,347 filed Nov. 24, 2014, the disclosures of which are fully incorporated herein by their entireties.

FIELD OF THE INVENTION

The present invention relates to propylene-based polymers useful as modifiers for tire treads.

BACKGROUND OF THE INVENTION

The tire tread compound is the most important compound in a tire that dictates wear, traction, and rolling resistance. It is a technical challenge to deliver excellent traction, low rolling resistance while providing good tread wear. The challenge lies in the trade-off between wet traction and rolling resistance/tread wear. Raising the compound Tg would provide good wet traction but, at the same time, increase the rolling resistance and tread wear. There is a need for tire treads that can provide wet traction without increasing the rolling resistance and tread wear.

Certain additives have been disclosed whose function is to adjust the wet traction or rolling resistance of tire treads but none have been successful at balancing both. For example, functionalized styrene butadiene rubber (SBR) is one proposed method to improve this trade-off by improving filler dispersion. Nanoprene™ from Lanxess, sub-micron to micron sized gels consisting of nanoscale organic particles with highly crosslinked core and hydroxylated surface, is another additive proposed to increase tire wet traction without affecting rolling resistance when the grade with certain Tg is chosen. What would be most useful is a tire tread additive that could balance both wet traction and rolling resistance.

Related references include U.S. 2014/088264; U.S. 2014/275433; U.S. 2012/0245293; U.S. 2012/0245300; PCT/US/2012/027677 filed Mar. 5, 2012; U.S. Ser. No. 61/704,611 filed on Sep. 23, 2012; U.S. Ser. No. 61/704,725 filed on Sep. 23, 2012; U.S. Ser. No. 61/866,702 filed Aug. 16, 2013; and U.S. Ser. No. 61/860,407, filed Jul. 31, 2013.

SUMMARY OF THE INVENTION

Disclosed is a silyl-alkylamine functionalized polyolefin (PO-alkylamine-Si), an alkylsilane functionalized polyolefin, or an alkoxysilane functionalized polyolefin, wherein the polyolefin portion has a weight-average molecular weight within the range from 500 to 300,000 g/mole.

Also disclosed is a tire tread composition comprising the reaction product of components, by weight of the composition, within the range from 5 to 75 wt % of a diene elastomer; 20 to 80 wt % of filler; a curative agent; and 5 to 30 wt % of a silyl-alkylamine functionalized polyolefin (PO-alkylamine-Si), an alkylsilane functionalized polyolefin or an alkoxysilane functionalized polyolefin, each having a polyolefin portion and a functional group attached thereto.

Also disclosed is a method of balancing the wet traction performance and rolling resistance in a tire tread composition of any one of the previously numbered paragraphs, comprising combining at least a filler, a diene-elastomer, and a curative agent with a functionalized polyolefin to form a tire tread; wherein the functionalized polyolefin is selected and/or added in an amount that increases hysteresis in the wet traction region (0° C.) while lowering hysteresis in the rolling resistance region (60° C.) without changing the overall compound Tg by any more than 10% or 15% of its original value.

BRIEF DESCRIPTION OF THE DRAWINGS

FIG. 1 is a graphical representation of the Tangent Delta of various examples and control compositions as a function of temperature, as measured by Dynamic Mechanical Thermal Analysis (DMTA).

DETAILED DESCRIPTION

The tire tread composition is an important aspect in a tire that dictates wear, traction, and rolling resistance. It is a technical challenge to deliver excellent traction and low rolling resistance while providing good tread wear. The challenge lies in the trade-off between wet traction and rolling resistance/tread wear. Raising the composition's Tg would provide good wet traction but, at the same time, may increase the rolling resistance and tread wear. The embodiments described herein provide a tread compound additive that can accomplish wet traction without lowering the rolling resistance and tread wear. The problem has been approached by developing an additive—a functionalized polyolefin—that increases hysteresis in the wet traction region (0° C.) while lowering hysteresis in the rolling resistance region (60° C.) without changing the overall compound Tg. As used herein, "hysteresis" is equivalent to energy loss as measured by Tangent Delta (unitless). For example, a high tan delta equals high energy loss or high hysteresis.

The additive compounding step allows one to address the known deficiencies of polyolefin blends with diene elastomers such as styrene-butadiene rubber/polybutadiene/natural rubber (SBR/PBD/NR) blends by concentrating the carbon black and antioxidant in the polyolefin domain along with functionalization of the polyolefin to improve abrasion resistance, cure state and UV stability. These deficiencies include poorly vulcanized and poorly reinforced polyolefin domains, as curatives and fillers tend to migrate away from the polyolefin due to unfavorable solubility parameter differences. The present embodiments described herein overcome one or more of these deficiencies.

More particularly, the invention(s) disclosed are directed to the synthesis and use of functionalized polyolefins containing an alkoxysilane or an alkylsilane functionality and optionally having ether, hydroxyl and/or amine functionality. The functionalized POs can be the reaction product of vinyl/vinylidene terminated polyolefins (VTP), for instance, amorphous polypropylene having terminal vinyl/vinylidene groups with a hydrosilylation reagent or via epoxidation of the vinyl/vinylidene terminus, followed by reaction with an aminosilane-containing reagent. The amorphous or semicrystalline polyolefin portion is preferred to have glass transition temperatures (Tg) from −50° C. to 10° C., more preferably from −45° C. to 5° C., and most preferably from −40° C. to 0° C. The weight average molecular weight (Mw) of the polyolefin portion is preferably from 1,000 to 150,000 g/mole, more preferably from 2,500 to 125,000 g/mole, and most preferably from 5,000 to 300,000 g/mole. The polyolefin portion is derived directly from the VTP, described further below, and is preferably a homopolymer or copolymer of linear α-olefins from C2 to C12.

Vinyl/Vinylidene-Terminated Polyolefin (VTP)

The vinyl/vinylidene-terminated polyolefins useful in the inventive functionalized polymers described herein can be made in any number of ways. By "vinyl/vinylidene", what is meant is that the polyolefin may be a mixture of both vinyl- and vinylidene-terminated polyolefins, or the polyolefin may be substantially all one form or the other. Preferably, the VTP's useful herein are polymers as first described in U.S. 2009/0318644 having at least one terminus (CH$_2$CH=CH$_2$-oligomer or polymer) represented by formula (I):

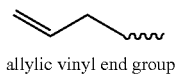

(I)

allylic vinyl end group where the "⌇⌇⌇" represents the "PO" portion of the inventive functionalized polyolefins. In a preferred embodiment the allyl chain ends are represented by the formula (II):

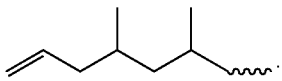

(II)

The amount of allyl chain ends is determined using $^1$H NMR at 120° C. using deuterated tetrachloroethane as the solvent on a 500 MHz machine, and in selected cases confirmed by $^{13}$C NMR. These groups (I) and (II) will react to form a chemical bond with a metal as mentioned above to form the M-CH$_2$CH$_2$-polymer. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114, J. AM. CHEM. SOC., 1025-1032, (1992) that are useful herein.

The vinyl/vinylidene-terminated propylene-based polymers may also contain an isobutyl chain end. "Isobutyl chain end" is defined to be an oligomer having at least one terminus represented by the formula (III):

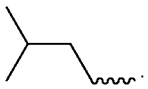

(III)

In a preferred embodiment, the isobutyl chain end is represented by one of the following formulae:

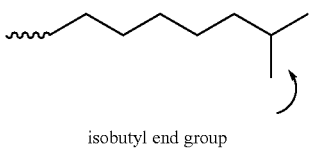

isobutyl end group

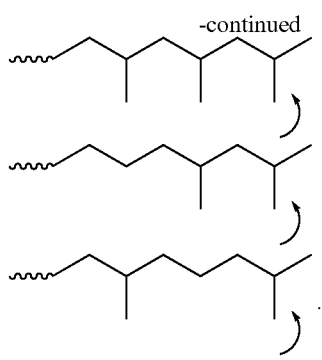

-continued

The percentage of isobutyl end groups is determined using $^{13}$C NMR (as described in the example section) and the chemical shift assignments in Resconi for 100% propylene oligomers. Preferably, the vinyl/vinylidene-terminated polymers described herein have an allylic terminus, and at the opposite end of the polymer an isobutyl terminus.

The VTPs can be made by any suitable means, but most preferably the VTPs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å$^3$) perfluorinated boron activator, for example, as described in US 2012/0245299.

The vinyl/vinylidene-terminated polyolefin can be any polyolefin having a vinyl/vinylidene-terminal group, and is preferably selected from the group consisting of vinyl/vinylidene-terminated isotactic polypropylenes, atactic polypropylenes, syndiotactic polypropylenes, propylene-butene copolymers, propylene-hexene copolymers, and propylene-ethylene copolymers (wherein the copolymers may be random, elastomeric, impact and/or block), and combinations thereof, each having a number-average molecular weight (Mn) of at least 300 g/mole. The VTP is most preferably an atactic polypropylene. In certain embodiments, the VTP may be a copolymer or terpolymer wherein the C2 content (ethylene derived units) of the vinyl/vinylidene-terminated polyolefin is from 3 to 50 wt %, the C3 content (propylene derived units) is from 50 to 97 wt %; in yet another embodiment, the VTP may contain a third comonomer, thus, the C4 through C14 content (units derived from C4 to C14 α-olefins or dienes) is from 5 to 30 wt % in those embodiments, while the C2 content is from 5 to 50 wt % and the C3 content is from 20 to 90 wt %.

Preferably, greater than 90 or 94 or 96% of the VTP comprises terminal vinyl groups; or within the range of from 50 or 60 wt % to 70 or 80 or 90 or 95 or 98 or 99%. As described above, the vinyl/vinylidene-terminated polyolefins preferably have a number average molecular weight (Mn) value of at least 1000 or 5000 or 20,000 g/mole, or within the range of from 200 or 400 or 500 or 1,000 or 10,000 or 20,000 g/mole to 20,000 or 30,000 or 40,000 or 50,000 or 65,000 or 100,000 g/mole. The vinyl/vinylidene-terminated polyolefins preferably have a weight-average molecular weight (Mw) value of at least 500 or 800 or 1000 or 5000 or 20,000 g/mole, or within the range of from 500 or 800 or 1000 or 2000 g/mole to 6,000 or 10,000 or 12,000 or 20,000 or 30,000 or 40,000 or 50,000 or 100,000 or 200,000 or 300,000 g/mole. Preferably, the VTP useful herein is amorphous polypropylene, and desirably has a glass transition temperature (Tg) of less than 10 or 5 or 0°

C., more preferably less than −10° C.; or within the range of from 0 or −5 or −10° C. to −30 or −40 or −50° C. or as described herein.

The VTPs are preferably linear, meaning that there is no polymeric or oligomeric branching from the polymer backbone, or described quantitatively, having a branching index "g" (or $g'_{(vis\ avg)}$) of at least 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in U.S. 2013/0090433.

A particularly preferred VTP is one wherein the vinyl terminated polyolefin is a compound or mixture of compounds represented by the formula (V):

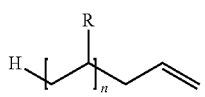

(V)

wherein each R is selected from hydrogen and $C_1$ to $C_4$ or $C_{10}$ alkyls; and n is an integer from 2 or 4 or 10 or 20 to 50 or 100 or 200 or 500 or 800.

Functionalized Polyolefins

The "functionalized polyolefins" described herein are VTP's that have been functionalized, thus comprising a polyolefin portion and a functional group attached thereto, preferably by means of one or more covalent bonds. The VTP's described herein are functionalized such that the vinyl/vinylidene terminus of the VTP undergoes a reaction wherein the final PO includes alkylsilane or alkoxylsilane functionality. Depending upon a series of chemical reactions, the ultimate functionalized PO will also include amine functionality, hydroxyl functionality, ether functionality and/or siloxane functionality.

For example, a VTP can be treated with a glycidoxyalkyltetraalkylsiloxane which can then undergo reaction with an alkylaminotrialkoxysilane to provide a functionalized PO (formula (VI)) as noted in Scheme I:

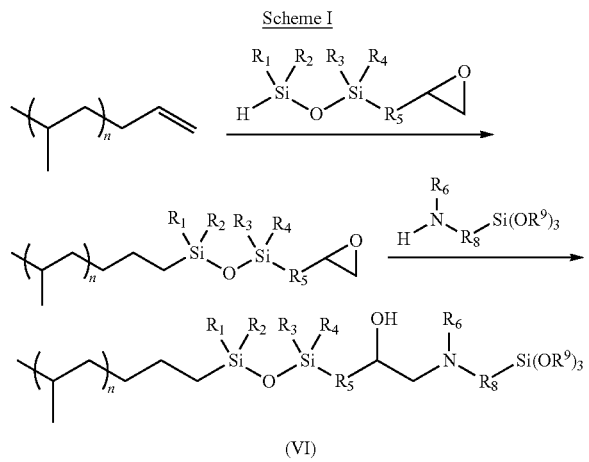

wherein n is from 50 to 11,000;

$R^1$, $R^2$, $R^3$ and $R^4$ are each independently a C1 to a C10 substituted or unsubstituted branched or unbranched alkyl group or a C5 to a C18 substituted or unsubstituted aryl group; and in certain aspects, $R^1$, $R^2$, $R^3$ and $R^4$ are each methyl groups;

$R^5$ and $R^8$ are each independently a C1 to a C20 substituted or unsubstituted branched or unbranched alkylene group or a C5 to a C18 substituted or unsubstituted arylene group with or without heteroatoms such as oxygen and nitrogen; and preferably, $R^5$ and $R^8$ are independently C3 to C5 alkylene groups;

$R^6$ is a hydrogen atom or a C1 to a C10 substituted or unsubstituted branched or unbranched alkyl group or a C5 to a C18 substituted or unsubstituted aryl group, preferably $R^6$ is a hydrogen atom; and $R^9$ are each independently C1 to a C10 substituted or unsubstituted branched or unbranched alkyl group or a C5 to a C18 substituted or unsubstituted aryl group, preferably each $R^9$ is a ethyl or methyl group.

Most preferably, R', $R^2$, $R^3$ and $R^4$ are each methyl groups, $R^5$ and $R^8$ are C3 to C5 alkylene groups, $R^6$ is a hydrogen atom and each $R^9$ is an ethyl or methyl group.

Alternatively, the VTP can be treated with an epoxidation reagent followed by an aminoalkylalkoxysilane to provide a functionalized PO (formula VII) as noted in Scheme II:

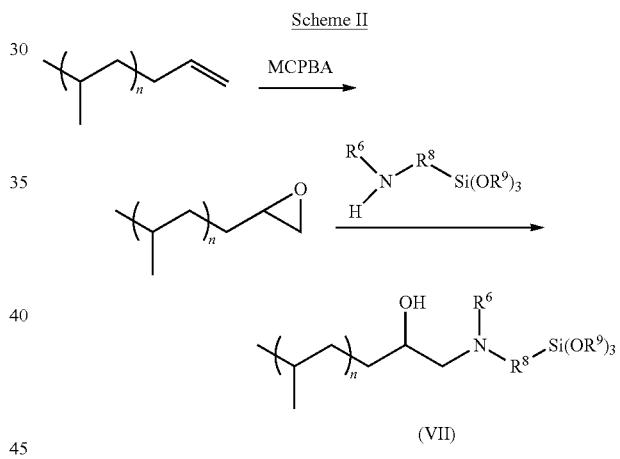

wherein n, $R^6$, $R^8$ and $R^9$'s are as defined above.

In another embodiment, a VTP can be treated with a glycidoxyalkyltetraalkylsiloxane which can then undergo reaction with an aminoalkylalkoxysilane to provide a functionalized PO (formula VIII) as noted in Scheme III:

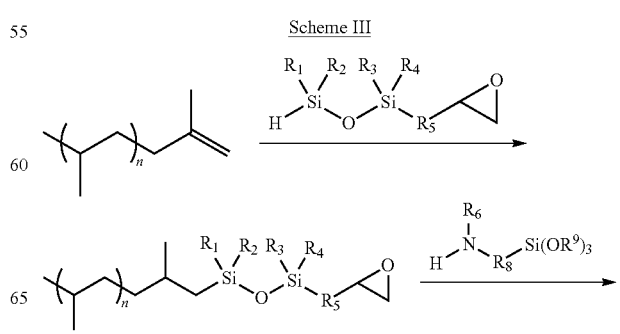

-continued

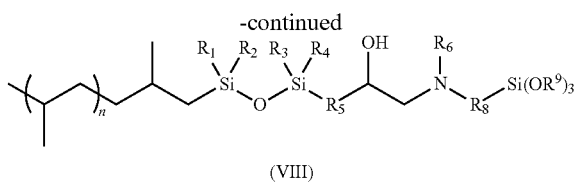

(VIII)

wherein n, $R^1$, $R^2$, $R^3$, $R^4$, $R^5$, $R^6$, $R^8$ and $R^9$'s are as defined above.

In yet another embodiment, a VTP can be treated with an epoxidation reagent followed by an aminoalkylalkoxysilane to provide a functionalized PO (formula IV) as noted in Scheme IV:

Scheme IV

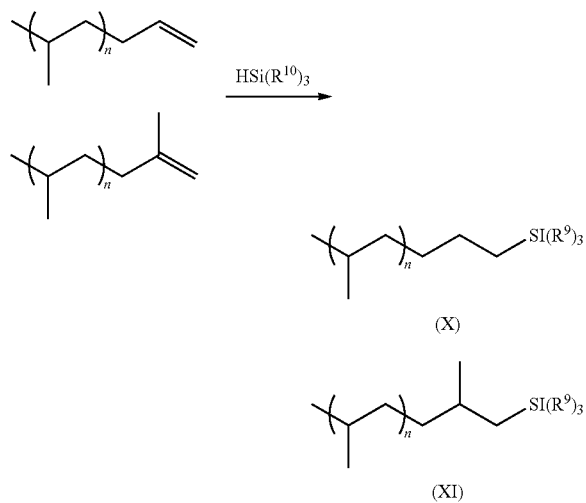

(IV)

Preferably, $R^8$ is a C3 to C5 alkylene group in structure (IV). Also, preferably, $R^6$ is a hydrogen atom. Also, preferably, each $R^9$ is an ethyl or methyl group. Finally, preferably $R^8$ is a C3 to C5 alkylene group, $R^6$ is a hydrogen atom and each $R^9$ is an ethyl or methyl group.

In still another embodiment, a VTP can be treated with a trialkylsilane to provide functionalized PO's (X and XI) as shown in Scheme V:

Scheme V wherein n is defined above and each $R^9$, independently, is a C1 to a C10 substituted or unsubstituted branched or unbranched alkyl group or a C5 to a C18 substituted or unsubstituted aryl group. Most preferably, each $R^9$ is a methyl or ethyl group in (X) or (XI).

In yet another embodiment, a VTP can be treated with a trialkoxysilane to provide functionalized PO (XII and XIII) as shown in Scheme VI:

Scheme VI

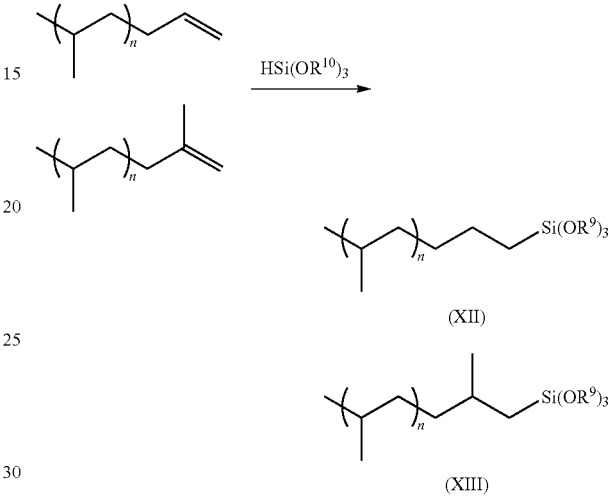

wherein n and each $R^9$ are as defined above. Most preferably, each $R^9$ is a methyl or ethyl group in (XII) or (XIII).

Elastomers

The inventive tire tread compositions may comprise one or more elastomers. In some embodiments, the range of the elastomer is from 5, or 10, or 20, or 30, or 40, or 50 wt %, to 65, or 75 wt % by weight of the tire tread composition. Suitable elastomers include, for example, diene elastomers.

"Diene elastomer" is understood to mean an elastomer resulting at least in part (homopolymer or copolymer) from diene monomers (monomers bearing two double carbon-carbon bonds, whether conjugated or not). The compositions described herein can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

The diene elastomer may be chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

According to a specific embodiment, the diene elastomer is predominantly (i.e., for more than 40 or 50 phr) an SBR (regardless of its method of production) or blends such as an SBR/BR, SBR/NR (or SBR/IR), BR/NR (or BR/IR) or also SBR/BR/NR (or SBR/BR/IR) blend. In the case of an SBR elastomer, use is made in particular of an SBR having a moderate styrene content, for example, of from 20% to 35% by weight, or a high styrene content, for example, from 35 to 45%, a content of vinyl bonds of the butadiene part of from 15% to 70%, a content (molar %) of trans-1,4-bonds of from 15% to 75% and a Tg of from −10° C. to −55° C.; such an SBR can advantageously be used as a mixture with a BR preferably having more than 90% (molar %) of cis-1,4-bonds.

According to one aspect, each diene elastomer having a Tg −75° C. to −40° C. is selected from the group consisting of styrene butadiene copolymers, natural polyisoprenes, synthetic polyisoprenes having a cis-1,4 linkage content greater than 95%, styrene/butadiene/isoprene terpolymers and a mixture of these elastomers, and each diene elastomer having a Tg from −110° C. to −75° C., preferably from −105° C. to −80° C., is selected from the group consisting of polybutadienes having a cis-1,4 linkage content greater than 90% and isoprene/butadiene copolymers comprising butadiene units in an amount equal to or greater than 50%.

In another aspect, each diene elastomer having a Tg from −75° C. to −40° C. is selected from the group consisting of natural polyisoprenes and synthetic polyisoprenes having a cis-1,4 linkage content greater than 95%, and each diene elastomer having a Tg from −110° C. to −75° C. is a polybutadiene having a cis-1,4 linkage content greater than 90%.

These diene elastomers can be classified into two categories: "essentially unsaturated" or "essentially saturated". The term "essentially unsaturated" is understood to mean a diene elastomer resulting at least in part from conjugated diene monomers having a level of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term "diene elastomer" as used herein is understood more particularly to mean: (a) any homopolymer obtained by polymerization of a conjugated diene monomer having from 4 to 12 carbon atoms; (b) any copolymer obtained by copolymerization of one or more conjugated dienes with one another or with one or more vinylaromatic compounds having from 8 to 20 carbon atoms; (c) a ternary copolymer obtained by copolymerization of ethylene and of an alpha-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene; or (d) a copolymer of isobutene and of isoprene (butyl rubber) and also the halogenated versions, in particular chlorinated or brominated versions, of this type of copolymer.

The following diene elastomers are suitable in particular as conjugated dienes: 1,3-butadiene, 2-methyl-1,3-butadiene, 2,3-di(C1-C5 alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The diene elastomer(s) can comprise from 99% to 20% by weight of diene units and from 1% to 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or polyether groups (such as described, for example, in EP 1 127 909 or U.S. Pat. No. 6,503,973).

Polybutadienes, alone or in a blend with other elastomers, are also useful in the inventive compositions, in particular those having a content (molar %) of 1,2-units of from 4% to 80% or those having a content (molar %) of cis-1,4-units of greater than 80%, polyisoprenes, butadiene/styrene copolymers and in particular those having a Tg (glass transition temperature, measured according to Standard ASTM D3418) of from 0° C. to −70° C. and more particularly from −10° C. to −60° C., a styrene content of from 5% to 60% by weight and more particularly from 20% to 50%, a content (molar %) of 1,2-bonds of the butadiene part of from 4% to 75% and a content (molar %) of trans-1,4-bonds of from 10% to 80%, butadiene/isoprene copolymers, in particular those having an isoprene content of from 5% to 90% by weight and a Tg of −40° C. to −80° C., or isoprene/styrene copolymers, in particular those having a styrene content of from 5% to 50% by weight and a Tg of from −25° C. to −50° C. In the case of butadiene/styrene/isoprene copolymers, those having a styrene content of from 5 wt % to 50 wt % and more particularly of from 10 wt % to 40 wt %, an isoprene content of from 15 wt % to 60 wt % and more particularly from 20 wt % to 50 wt %, a butadiene content of from 5 wt % to 50 wt % and more particularly of from 20 wt % to 40 wt %, and a content (molar %) of 1,2-units of the butadiene part of from 4 mol % to 85 mol %, a content (molar %) of trans-1,4-units of the butadiene part of from 6 mol % to 80 mol %, a content (molar %) of 1,2- and 3,4-units of the isoprene part of from 5 mol % to 70 mol %, and a content (molar %) of trans-1,4-units of the isoprene part of from 10 mol % to 50 mol %, and any butadiene/styrene/isoprene copolymer having a Tg of from −20° C. to −70° C., are particularly suitable.

According to still another aspect, the diene elastomer comprises a blend of a (one or more) "high Tg" diene elastomer exhibiting a Tg of from −70° C. to 0° C. and of a (one or more) "low Tg" diene elastomer exhibiting a Tg of from −110° C. to −80° C., more preferably from −105° C. to −90° C. The high Tg elastomer is preferably chosen from the group consisting of SBRs, natural rubber, synthetic polyisoprenes (exhibiting a level (molar %) of cis-1,4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

In this regard, the rubber composition comprises, for example, from 30 to 100 phr, in particular from 50 to 100 phr (parts by weight per hundred parts of total elastomer), of a high Tg elastomer as a blend with 0 to 70 phr, in particular from 0 to 50 phr, of a low Tg elastomer; according to another example, it comprises, for the whole of the 100 phr, one or more SBR(s) prepared in solution.

According to another embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

Although any styrenic copolymer is useful, those most desirable in the tire compositions are styrene-butadiene block copolymer "rubbers." Such rubbers preferably have from 10 or 15 or 20 wt % to 30 or 25 or 40 wt % styrene derived units, by weight of the block copolymer, and within the range of from 30 or 40 or 45 wt % to 55 or 60 or 65 wt % vinyl groups.

Useful tire tread compositions can preferably comprise 15 to 50 or 60 wt % of an elastomer or blend of elastomers, such as a styrenic copolymer and/or polyisobutylene and/or polyisoprene mentioned above; more particularly, 1 or 5 wt % to 60 wt % of a polybutadiene polymer as mentioned above; more particularly 1 or 5 wt % to 40 or 60 wt % of natural rubber or synthetic polyisoprene; more particularly 5 or 15 wt % to 50 or 60 wt % of a functionalized styrenic copolymer ("functionalized" as is known in the art); more particularly 1 or 5 wt % to 40 or 60 wt % of a functionalized polar polybutadiene polymer ("functionalized" as is known in the art); and/or more particularly 1 or 5 wt % to 60 wt % of natural rubber or functionalized synthetic polyisoprene ("functionalized" as is known in the art). The inventive tire tread compositions can also not include processing oil, or within a range from 5 wt % to 20 or 40 wt % of processing oil; as well as 20 wt % to 60 wt % of filler, especially silica-based filler as described herein; at least one curative agent; and 5 or 10 wt % to 20 or 25 or 30 wt % of one or more functionalized VTPs as described herein. Other potential additives may include 1 or 5 wt % to 40 wt % of a hydrocarbon resin, the weight percentages based on the total composition.

Inorganic Filler

The term "filler" as used herein refers to any material that is used to reinforce or modify physical properties, impart certain processing properties, or reduce cost of an elastomeric composition. Use may be made of any type of reinforcing filler known for its capabilities of reinforcing a rubber composition which can be used for the manufacture of tires, for example, an organic filler, such as carbon black, a reinforcing inorganic filler, such as silica, or a blend of these two types of filler, in particular a blend of carbon black and silica.

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and range, for example, in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name Zeosil™ Z1165.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200, or 300 series (ASTM grades), such as, for example, the N115, N134, N234, N326, N330, N339, N347, or N375 blacks, or also, depending on the applications targeted, the blacks of higher series (for example, N660, N683, or N772). The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO 2006/069792 and WO 2006/069793.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible ("HDS") precipitated silicas, for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as described in Application WO 2003/16837.

Mention may also be made, as other examples of inorganic filler being capable of being used, of reinforcing aluminum (oxide), hydroxides, titanium oxides or silicon carbides (see, for example, application WO 2002/053634 or US 2004/0030017).

When the compositions of the invention are intended for tire treads with a low rolling resistance, the reinforcing inorganic filler used, in particular if it is silica, preferably has a BET surface of from 45 to 400 m²/g, more preferably of from 60 to 300 m²/g.

Preferably, the level of total reinforcing filler (carbon black and/or reinforcing inorganic filler) is from 20 to 200 phr, more preferably from 30 to 150 phr, the optimum being in a known way different depending on the specific applications targeted: the level of the reinforcement expected with regard to a bicycle tire, for example, is, of course, less than that required with regard to a tire capable of running at high speed in a sustained manner, for example, a motor cycle tire, a tire for a passenger vehicle or a tire for a commercial vehicle, such as a heavy duty vehicle.

Coupling Agent

As used herein, the term "coupling agent" is meant to refer to any agent capable of facilitating stable chemical and/or physical interaction between two otherwise non-interacting species, e.g., between a filler and a diene elastomer. Preferably, the functional polyolefins described herein fulfill this purpose, so most preferably, the tire treads and tire tread compositions described herein do no include coupling agents alone, that is, no coupling agents are added to the compositions other than the functionalized polyolefins.

Nonetheless, coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (V)

$$Z\text{-}A\text{-}S_x\text{-}A\text{-}Z \qquad (V)$$

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (XIV):

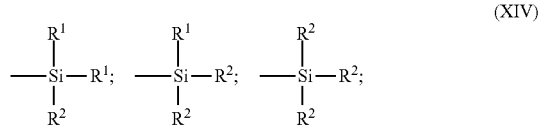

(XIV)

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)-tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Other examples include bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl) tetrasulphide, such as described in WO 02/083782. WO 03/002648 and WO 03/002649 further disclose silane polysulfides.

The coupling agent can also be bifunctional POSs (polyorganosiloxanes), or hydroxysilane polysulphides, as described in WO 02/30939; WO 02/31041; and WO2007/061550, or silanes or POSs bearing azodicarbonyl functional groups, as described in WO 2006/125532; WO 2006/125533; and WO 2006/125534. The coupling agent can also include other silane sulphides, for example, silanes having at least one thiol (—SH) functional group (referred to as mercaptosilanes) and/or at least one masked thiol functional group, as described in U.S. Pat. No. 6,849,754; WO 99/09036; WO 2006/023815; WO 2007/098080; WO 2008/055986; and WO 2010/072685.

The coupling agent can also include combinations of one or more coupling agents described herein, as further described in WO 2006/125534. A preferred coupling agent comprises alkoxysilane or polysulphurized alkoxysilane. A particularly preferred polysulphurized alkoxysilane is bis(triethoxysilylpropyl) tetrasulphide, which is commercially available by Degussa under the trade name X50S™.

Plasticizer

As used herein, the term "plasticizer" (also referred to as a processing oil), refers to a petroleum derived processing oil and synthetic plasticizer. Such oils are primarily used to improve the processability of the composition and may form part of the inventive compositions or tire treads described herein. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name Nytex™ 4700.

Mild-Extraction Solvate (MES) and Treated Distillate Aromatic Extract (TDAE) oils are well known to a person skilled in the art; for example, reference is made to "Safe Process Oils for Tires with Low Environmental Impact" in 52 (December 1999) KGK (Kautschuk Gummi Kunstoffe) 799-805 (1999). Disclosures of such oils, as a substitute for conventional aromatic oils, are, for example, EP 1 179 560 (or US 2002/0045697) or EP 1 270 657. Mention may be made, as examples of MES oils (whether they are of the "extracted" or "hydrotreated" type) or of TDAE oils, for example, of the products sold under the names "Flexon 683" by ExxonMobil, "Vivatec 200" or "Vivatec 500" by H&R European, "Plaxolene MS" by Total, or "Catenex SNR" by Shell.

Hydrocarbon resins may also be present in the inventive tire tread compositions. Hydrocarbon resins are preferably formed of $C_5$ fraction/vinylaromatic copolymer, in particular of $C_5$ fraction/styrene or $C_5$ fraction/$C_9$ fraction copolymer, are well known; they have been essentially used to date for application as tackifying agents for adhesives and paints but also as processing aids in tire rubber compositions. The $C_5$ fraction/vinylaromatic copolymer is, by definition and in a known way, a copolymer of a vinylaromatic monomer and of a $C_5$ fraction. Styrene, alpha-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene and any vinylaromatic monomer resulting from a $C_9$ fraction (or more from a $C_8$ to $C_{10}$ fraction), for example, are suitable as vinylaromatic monomers. Preferably, the vinylaromatic compound is styrene or a vinylaromatic monomer resulting from a $C_9$ fraction (or from a $C_8$ to $C_{10}$ fraction).

The term "$C_5$ fraction" (or, for example, "$C_9$ fraction" respectively) is understood to mean any fraction resulting from a process resulting from petrochemistry or from the refining of petroleums, any distillation fraction predominantly comprising compounds having 5 (or respectively 9, in the case of a $C_9$ fraction) carbon atoms; the $C_5$ fractions, for example, may comprise, by way of illustration and without limitation, the following compounds, the relative proportions of which may vary according to the process by which they are obtained, for example, according to the origin of the naphtha and the steam cracking process: 1,3-butadiene, 1-butene, 2-butenes, 1,2-butadiene, 3-methyl-1-butene, 1,4-pentadiene, 1-pentene, 2-methyl-1-butene, 2-pentenes, isoprene, cyclopentadiene, which can be present in the form of its dicyclopentadiene dimer, piperylenes, cyclopentene, 1-methylcyclopentene, 1-hexene, methylcyclopentadiene or cyclohexene. These fractions may be obtained by any chemical process known in the petroleum industry and petrochemistry. Examples of suitable hydrocarbon resins include Escorez™ resins from ExxonMobil Chemical Company.

Other Additives

Antioxidants and other additives may be present in the inventive tire tread compositions. As used herein, the term "antioxidant" refers to a chemical that combats oxidative degradation. Suitable antioxidants include diphenyl-p-phenylenediamine and those disclosed in *The Vanderbilt Rubber Handbook*, 344 to 346, (1978). A particularly preferred antioxidant is para-phenylenediamines, which is commercially available by Eastman under the trade name Santoflex™ 6PPD.

Other additives may include, for example, fire/flame retardants, plasticizers, curative agents, curative accelerators, cure retarders, processing aids, tackifying resins, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents, lubricants, and nucleating agents. The lists described herein are not intended to be inclusive of all types of additives which may be employed with the present invention.

The inventive compositions and tire treads made from those compositions are manufactured with the aid of at least one cure package, at least one curative, at least one cross-linking agent, and/or undergo a process to cure the elastomeric composition. As used herein, at least one "curing agent" refers to any material or method capable of imparting cured properties to a rubber as is commonly understood in the industry. A preferred agent is sulfur, which may include a metal oxide such as a zinc oxide, and accellerants such as benzothiazolesulfenamides and/or diphenylguanidines.

The inventive tire tread compositions may further comprise within the range from 5 or 10 wt % to 15 or 20 or 25 wt %, by weight of the composition of a propylene-α-olefin elastomer. Such elastomers are described in, for example, U.S. Pat. No. 8,013,093, and is sold under such names as Vistamaxx™, Tafmer™, and Versify™. These are random polypropylene copolymers having from 5 to 25 wt % ethylene or butene-derived comonomer units having limited isotactic sequences to allow for some level of crystallinity, the copolymers have a weight average molecular weight within the range of from 10,000 or 20,000 g/mole to 100,000 or 200,000 or 400,000 g/mole and a melting point (DSC) of less than 110 or 100° C.

Processing

The inventive tire tread composition may be compounded (mixed) by any conventional means known to those skilled in the art. The compounding may be to form the composition, which can then be molded into tire treads as is known in the art, or compounded directly into the form of a tire tread, thus, the meaning used herein of "A tire tread composition comprising the reaction product of," as there will be known crosslinking between groups and components of the composition, as well as other potential and/or unexpected reactions between components resulting in the "tire tread composition" or "tire treads" described herein.

The mixing may occur in a single step or in multiple stages. For example, the ingredients are mixed in at least two stages, namely at least one non-productive stage followed by a productive mixing stage. The terms "non-productive" and "productive" mix stages are well known to those having skill in the rubber mixing art. The elastomers, polymer additives, silica and silica coupler, and carbon black, if used, are mixed in one or more non-productive mix stages. Most preferably, the polymers are mixed first at 110° C. to 130° C. for 30 seconds to 2 minutes, followed by addition of the silica, silica coupler, and other ingredients, the combination of which is further mixed, most preferably at an increasing temperature up to 140° C. to 160° C. for 30 seconds to 3 or 4 minutes. Most desirably the silica is mixed in portions, most preferably one half, then the second half. The final curatives are mixed in the productive mix stage. In the productive mix stage, the mixing occurs at a temperature, or ultimate temperature, lower than the mix temperature(s) of the preceding non-productive mix stage(s).

The tire tread composition has many desirable properties when the functionalized polyolefin is present in the compositions. Also, the maximum Energy Loss (Tangent Delta, wherein the slope is zero) of the immiscible polyolefin domain of the cured composition is preferably a temperature within the range from −30 to 10° C. or −25 or −20 or −10° C. to −5 or 0 or 10° C. Finally, domains comprising the functionalized polyolefin in the polymer matrix of the other components have sizes that are preferred to be less than 20 microns, more preferably less than 10 microns, and most preferably less than 5 microns; or within a range of from 0.1 or 0.2 or 0.5 or 1.0 microns to 5 or 10 or 20 microns.

The various descriptive elements and numerical ranges disclosed herein for the functionalized polyolefins, tire tread compositions, and their use in tire tread compositions can be combined with other descriptive elements and numerical ranges to describe the invention(s); further, for a given element, any upper numerical limit can be combined with any lower numerical limit described herein. The features of the invention are described in the following non-limiting examples.

EXAMPLES

The Table 1 below describes the major components in various comparative ("control") and inventive ("examples") working examples, with a description of the synthesis of each to follow:

TABLE 1

| | Control 1 | Example 1 | Control 2 | Control 3 | Example 2 | Example 3 |
|---|---|---|---|---|---|---|
| functionalized VTPs | | | | | | |
| Vinyl/vinylidene terminated atactic PP (Mn = 24k) | X | | | | | |
| (EtO)3 Si—R—N—R- terminated atactic PP (Mn = 24k) | | X | | | | |
| Vinyl/vinylidene terminated atactic PP (Mn = 59k) | | | X | | | |
| (Et)3 Si—R- terminated atactic PP (Mn = 59k) | | | | X | | |
| (EtO)3 Si—R- terminated atactic PP (Mn = 59k) | | | | | X | |
| (EtO)3 Si—R—N—R- terminated atactic PP (Mn = 59k) | | | | | | X |

Example 1

In a nitrogen-filled glove box, 50 g of vinyl/vinylidene-terminated atactic polypropylene, having an Mn of 24,000 g/mole (Control 1) (prepared by the methods outlined in US 2009/0318644) was dissolved in 500 mL anhydrous toluene in a 1 L round bottom flask, followed by addition of 3 mL of (3-glycidoxypropyl)-1,1,3,3-tetramethyldisiloxane and 17 drops of Karstedt's catalyst (platinum(0)-1,3-divinyl-1,1,3,3-tetramethyldisiloxane complex) solution. The reaction mixture was transferred to a fume hood. The reaction mixture was stirred overnight at room temperature with dry air purging. The reaction mixture was concentrated by removing solvent on a rotary evaporator. The crude product was dried in a vacuum oven at 60° C. until constant weight to yield about 50 g polymer.

Under nitrogen protection, the above crude product was dissolved in 500 mL xylenes at 90° C. followed by slow addition of 3.6 g meta-chloroperoxybenzoic acid (mCPBA) in 30 mL xylenes solution. The reaction mixture was stirred at 90° C. overnight. The reaction mixture was precipitated to methanol when it was still warm, to recover the polymer product. The precipitated polymer was filtered, washed with fresh methanol several times and dried in a vacuum oven at 60° C. until constant weight to yield 47.3 g polymer product.

Under nitrogen protection, 15 g of the above crude product was dissolved in 100 mL anhydrous toluene in a 250 mL 3-neck round bottom flask equipped with a condenser followed by addition of 3 mL 4-butylaminotriethoxysilane and 1.5 g magnesium bromide ethyl etherate. The reaction mixture was stirred at 120° C. overnight. The reaction mixture was cooled to room temperature, and passed through a thin pad of silica gel. The filtered reaction mixture was precipitated to 1 L methanol. The polymer product was recovered by filtration and dried in a vacuum oven at 60° C. until constant weight to yield 8.45 g product.

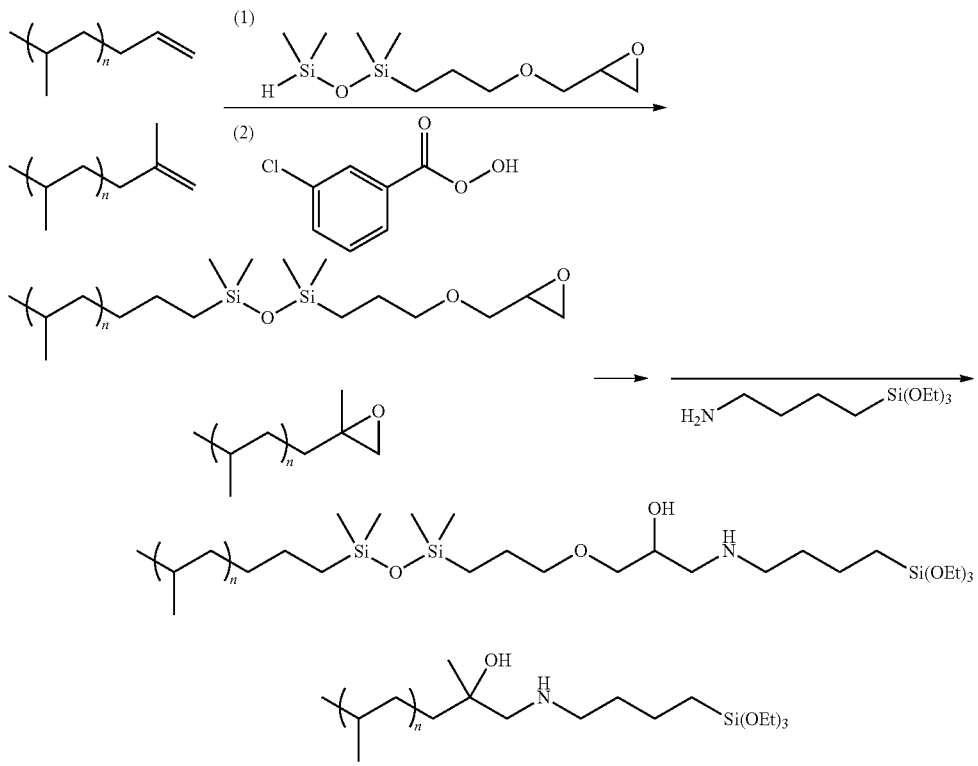

Example 2

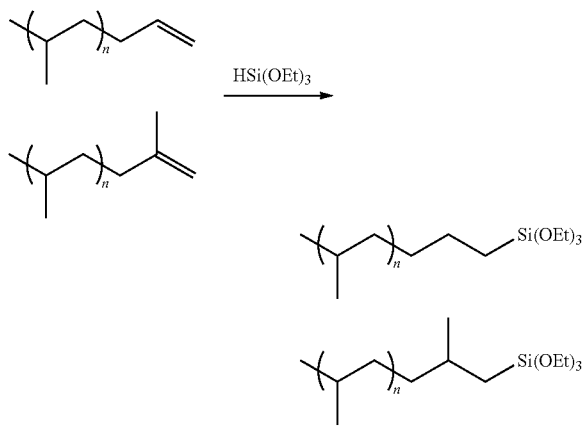

In a nitrogen-filled glove box, 15 g vinyl/vinylidene-terminated atactic PP having an Mn of 59,000 g/mole (Control 2) was dissolved in 250 mL anhydrous toluene followed by addition of 0.2 mL triethoxysilane and 10 drops of Karstedt's catalyst (platinum(0)-1,3-divinyl-1,1,3,3-tetramethyldisiloxane complex) solution. The reaction mixture was transferred to a fume hood and stirred overnight at room temperature under dry air purging. The reaction mixture was precipitated to 1 L methanol. The precipitated polymer was filtered and dried in a vacuum oven at 60° C. until constant weight to yield 11.7 g product.

Example 3

In a nitrogen-filled glove box, 50 g vinyl/vinylidene-terminated atactic PP having an Mn of 59,000 g/mole (Control 2) (prepared by the methods outlined in US 2009/0318644) was dissolved in 500 mL anhydrous toluene in a 1 L round bottom flask, followed by addition of 2 mL of (3-glycidoxypropyl)-1,1,3,3-tetramethyldisiloxane and 10 drops of Karstedt's catalyst (platinum(0)-1,3-divinyl-1,1,3,3-tetramethyldisiloxane complex) solution. The reaction mixture was transferred to a fume hood. The reaction mixture was stirred overnight at room temperature with dry air purging. The reaction mixture was concentrated by removing solvent on a rotary evaporator. The crude product was dried in a vacuum oven at 60° C. until constant weight to yield about 50 g polymer.

Under nitrogen protection, the above crude product was dissolved in 500 mL xylenes at 90° C. followed by slow addition of 1.47 g meta-chloroperoxybenzoic acid (mCPBA) in 30 mL xylenes solution. The reaction mixture was stirred at 90° C. overnight. The reaction mixture was precipitated to methanol when it was still warm, to recover the polymer product. The precipitated polymer was filtered, washed with fresh methanol several times and dried in a vacuum oven at 60° C. until constant weight to yield about 50 g polymer product.

Under nitrogen protection, 15 g of the above crude product was dissolved in 100 mL anhydrous toluene in a 250 mL 3-neck round bottom flask equipped with a condenser followed by addition of 1 mL 4-butylaminotriethoxysilane and 0.5 g magnesium bromide ethyl etherate. The reaction mixture was stirred at 120° C. overnight. The reaction mixture was cooled to room temperature, and passed through a thin pad of silica gel. The filtered reaction mixture was precipitated to 1 L methanol. The polymer product was

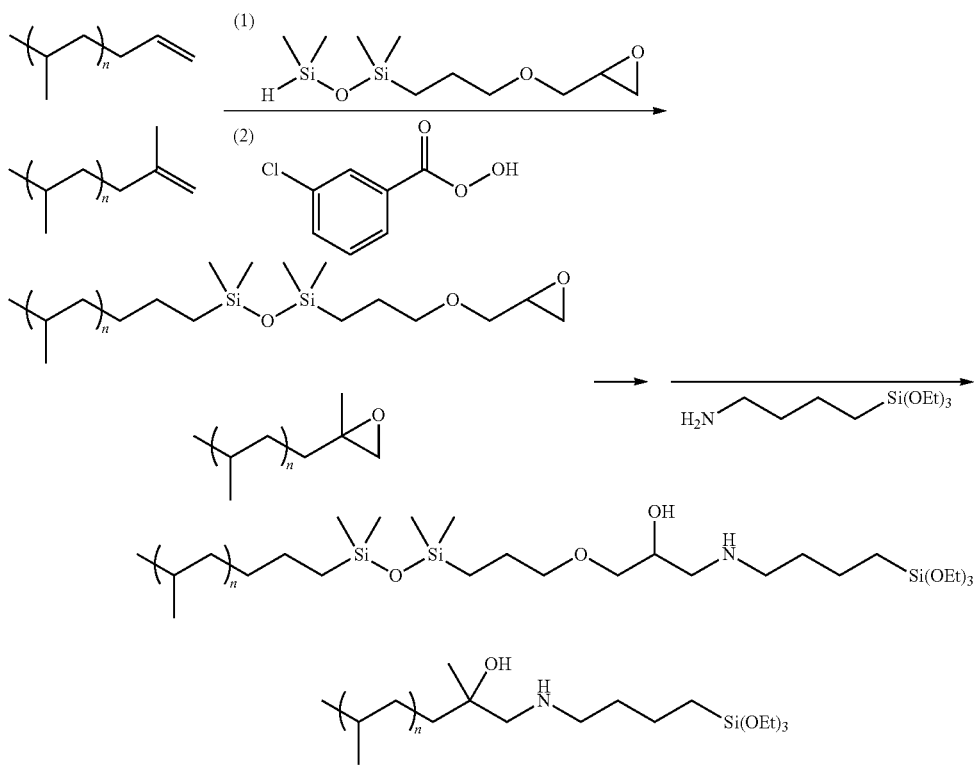

recovered by filtration and dried in a vacuum oven at 60° C. until constant weight to yield 4.62 g product.

Control 3

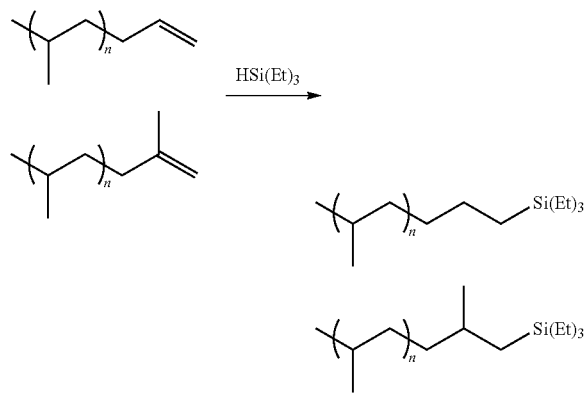

In a nitrogen-filled glove box, 15 g vinyl/vinylidene terminated atactic PP having an Mn of 59,000 g/mole (Control 2) was dissolved in 250 mL anhydrous toluene followed by addition of 0.2 mL triethylsilane and 10 drops of Karstedt's catalyst (platinum(0)-1,3-divinyl-1,1,3,3-tetramethyldisiloxane complex) solution. The reaction mixture was transferred to a fume hood and stirred overnight at room temperature under dry air purging. The reaction mixture was precipitated to 1 L methanol. The precipitated polymer was filtered and dried in a vacuum oven at 60° C. until constant weight to yield 12.5 g product.

Tread compound compositions for the controls and examples are listed in Table 2. All components are listed in phr, or part per hundred, of polymer unit. These compounds were mixed in two passes using a Banbury mixer which was warmed up to 120° C. for the first pass before any addition. The first pass mixed all components except curative at 25 RPM with polymers added at 0 minutes, half of the silica at 30 seconds, rest of the silica and all others with RPM ramped up to 152, and compounds removed at 7 minutes and 30 seconds with 151-153° C. compound temperature. After compounds were cooled, the same Banbury mixer was used to blend in the curatives during the second pass at 35 RPM and 70° C. The compound from the first pass was added into the mixer at 0 minutes with curatives added at 30 seconds followed by mixing for an another 6 minutes and 30 seconds with a total mix time of 7 minutes.

TABLE 2

Compositions

|  | Reference 1 & 2 | Control 1 | Example 1 | Control 2 | Control 3 | Example 2 | Example 3 |
|---|---|---|---|---|---|---|---|
| VSL 5025 (SBR 25% styrene, 50% vinyl) | 60 | 60 | 60 | 60 | 60 | 60 | 60 |
| Silica (Z1165) | 70 | 70 | 70 | 70 | 70 | 70 | 70 |
| PBD (Taktene 1203), high cis PBD | 40 | 40 | 40 | 40 | 40 | 40 | 40 |
| X50S (Si-69/N330 50/50) | 5.6 | 5.6 | 5.6 | 5.6 | 5.6 | 5.6 | 5.6 |
| Nytex 4700, (Naphthenic oil) | 20 | 20 | 20 | 20 | 20 | 20 | 20 |
| 6PPD,N-(1,3-Dimethylbutyl)-N'-phenyl-1,4-phenylenediamine | 2 | 2 | 2 | 2 | 2 | 2 | 2 |
| Control 1 | — | 14.2 | — | — | — | — | — |
| Example 1 | — | — | 14.2 | — | — | — | — |
| Control 2 | — | — | — | 14.2 | — | — | — |
| Control 3 | — | — | — | — | 14.2 | — | — |
| Example 2 | — | — | — | — | — | 14.2 | — |
| Example 3 | — | — | — | — | — | — | 14.2 |
| Stearic acid | 2.5 | 2.5 | 2.5 | 2.5 | 2.5 | 2.5 | 2.5 |
| Zinc Oxide | 2.5 | 2.5 | 2.5 | 2.5 | 2.5 | 2.5 | 2.5 |
| Vulkacit CBS-N-Cyclohexyl-2-benzothiazolesulfenamide | 1.7 | 1.7 | 1.7 | 1.7 | 1.7 | 1.7 | 1.7 |
| Sulfur | 1.4 | 1.4 | 1.4 | 1.4 | 1.4 | 1.4 | 1.4 |
| Perkacit DPG-N,N'-Diphenylguanidine | 2.0 | 2.0 | 2.0 | 2.0 | 2.0 | 2.0 | 2.0 |

TABLE 3

Properties of the Compositions

|  | Reference Avg. of 2 | Control 1 | Example 1 | Control 2 | Control 3 | Example 2 | Example 3 |
|---|---|---|---|---|---|---|---|
| Stress strain |  |  |  |  |  |  |  |
| 200% modulus (psi) | 946 | 759 | 796 | 797 | 848 | 790 | 791 |
| Tensile strength (psi) | 2397 | 2012 | 1919 | 2188 | 2184 | 2100 | 2044 |
| Elongation (%) | 414 | 436 | 402 | 448 | 428 | 436 | 440 |
| Ares (DMTA), 10 Hz, 3.5% strain |  |  |  |  |  |  |  |
| Tan delta @ −2 C. | 0.298 | 0.453 | 0.473 | 0.468 | 0.454 | 0.474 | 0.465 |
| Tan delta @ 1 C. | 0.281 | 0.390 | 0.405 | 0.402 | 0.385 | 0.406 | 0.401 |
| Tan delta @ 60 C. | 0.154 | 0.159 | 0.164 | 0.162 | 0.155 | 0.160 | 0.154 |

TABLE 3-continued

| | Properties of the Compositions | | | | | | |
|---|---|---|---|---|---|---|---|
| | Reference Avg. of 2 | Control 1 | Example 1 | Control 2 | Control 3 | Example 2 | Example 3 |
| MDR | | | | | | | |
| Minimum torque (dNm) | 10.37 | 8.06 | 7.67 | 8.6 | 8.49 | 8.43 | 9.02 |
| Maximum torque (dNm) | 40.85 | 32.58 | 33.91 | 34.3 | 34.92 | 35.06 | 34.95 |
| APA 2000 Strain sweep at 60 C., 5 Hz | | | | | | | |
| G" @ 3% strain (kPa) | 730 | 616 | 570 | 614 | 621 | 616 | 575 |
| G' @ 0.50% strain (kPa) | 8144 | 6093 | 5758 | 6092 | 6199 | 6122 | 5885 |
| G' @ 45% strain (kPa) | 1325 | 1132 | 1149 | 1166 | 1176 | 1173 | 1183 |
| peak tan delta on return strain @ 14% strain | 0.229 | 0.238 | 0.227 | 0.238 | 0.236 | 0.235 | 0.221 |

Various test methods include: MDR was determined by ASTM D5279-01; DMA was determined by APA 2000 per ASTM D7605; DMTA was determined by Ares per ASTM D5279-01. Stress strain was determined by ISO37, British Std. dies (type #2); and Hardness was determined by ASTM D2240.

All compounds were compression molded and cured into pads. Afterward, a rectangular test specimen was cut off from the cured pads and mounted in an ARES (Advanced Rheometric Expansion System, TA instruments) DMTA (ASTM D5279-01) for dynamic mechanical testing in torsion rectangular geometry. A strain sweep at room temperature (20° C.) up to 5.5% strains and at 10 Hz was conducted first, followed by a temperature sweep at 4% strain and 10 Hz from −35° C. to 100° C. at 2° C./min ramp rates. Storage and loss moduli were measured along with the loss tangent values. For better wet traction, it is preferred to have higher loss tangent values at temperatures below 0° C. whereas the loss tangent is preferred to be lower at 60° C. for better rolling resistance.

As listed in Table 3, the addition of functionalized polyolefin(s) raises the loss tangent values at temperatures below 0° C. without significantly raising the loss tangent value at 60° C.

The addition of the functionalized polyolefins to the tread compound allows one to significantly improve the traditional trade-off between tan delta at 0° C. and the tan delta values at 60° C. For example, see FIG. 1. The functionalization of the chain end significantly reduced hysteresis (APA tan delta @ 60 C). The Si—(OR)$_3$ group with the amine group within eight carbons preformed the best (lowest hysteresis).

Now, having described the inventive functionalized polyolefins and tire tread compositions including the inventive functionalized polyolefins, and process, described herein in numbered paragraphs is:

P1. A tire tread composition comprising the reaction product of components, by weight of the composition, within the range from 5 to 75 wt % of a diene elastomer; 20 to 80 wt % of filler; a curative agent; and 5 to 30 wt % of an aminoalkylsilyl-functionalized polyolefin (PO-aminoalkyl-Si), an alkylsilane-functionalized polyolefin or an alkoxysilane-functionalized polyolefin, each having a polyolefin portion and a functional group attached thereto.

P2. The tire tread composition of paragraph 1, wherein the PO-aminoalkyl-Si is a reaction product of an epoxidized vinyl/vinylidene-terminated polyolefin and an any one or mixture of an aminoalkylalkoxysilane, an alkylsilane-treated vinyl/vinylidene-terminated polyolefin, or an alkoxysilane-treated vinyl/vinylidene-terminated polyolefin.

P3. The tire tread composition of either of paragraphs 1 or 2, wherein the filler is a silica-based filler.

P4. The tire tread composition of any one of paragraphs 2 through 3, wherein the reaction product of an epoxidized vinyl/vinylidene-terminated polyolefin and an aminoalkylalkoxysilane is represented by the formulae

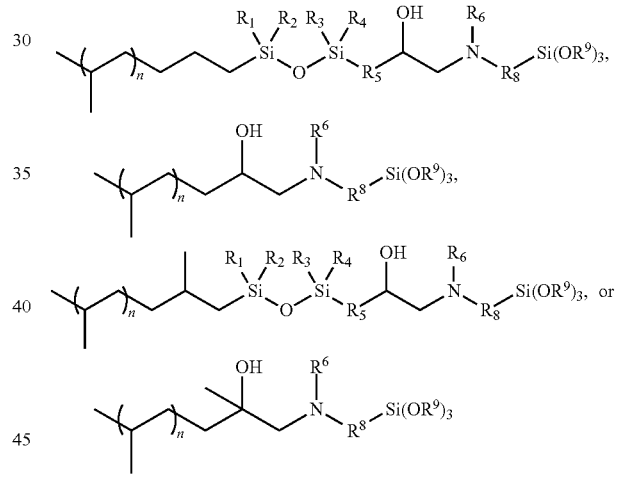

wherein n is from 50 to 11,000;

$R^1$, $R^2$, $R^3$ and $R^4$ are each independently a C1 to a C10 substituted or unsubstituted branched or unbranched alkyl group or a C5 to a C18 substituted or unsubstituted aryl group;

$R^5$ and $R^8$ are each a C1 to a C20 substituted or unsubstituted branched or unbranched alkylene group with or without heteroatoms such as oxygen and nitrogen, or a C5 to a C18 substituted or unsubstituted arylene group;

$R^6$ is a hydrogen atom or a C1 to a C10 substituted or unsubstituted branched or unbranched alkyl group or a C5 to a C18 substituted or unsubstituted aryl group; and each $R^9$, independently, are a C1 to a C10 substituted or unsubstituted branched or unbranched alkyl group or a C5 to a C18 substituted or unsubstituted aryl group.

P5. The tire tread composition of paragraphs 2 or 3, wherein aminoalkylsilyl-functionalized polyolefin (PO-aminoalkyl-Si), an alkylsilane-functionalized polyolefin or an alkoxysilane-functionalized polyolefin is the reaction product formed by combining a trialkylsilane and the vinyl/vinylidene-terminated polyolefin, the reaction product represented by one of the formulae:

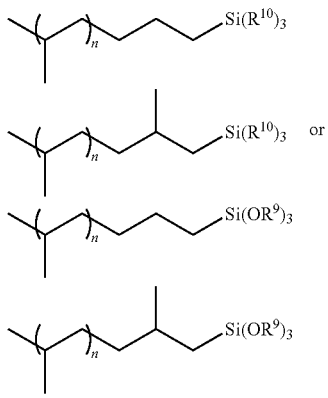

wherein n is from 50 to 11,000; and
each $R^9$, independently, is a C1 to a C10 substituted or unsubstituted branched or unbranched alkyl group or a C5 to a C18 substituted or unsubstituted aryl group.

P6. The tire tread composition of any one of the preceding numbered paragraphs, wherein the diene elastomer is a styrenic copolymer, a polybutadiene, natural rubber, a polyisoprene, a butadiene copolymer, an isoprene copolymer or blends thereof.

P7. The tire tread composition of any one of the preceding numbered paragraphs, wherein the polyolefin portion is an ethylene-propylene copolymer.

P8. The tire tread composition of any one of the preceding numbered paragraphs, wherein the number-average molecular weight ($M_n$) of the polyolefin portion is from 200 to 100,000 g/mole.

P9. The tire tread composition of any one of the preceding numbered paragraphs, wherein the polyolefin portion is an ethylene-propylene copolymer and a C4 through C14 α-olefin-containing polyolefin.

P10. The tire tread composition of any one of the preceding numbered paragraphs, wherein the polyolefin portion is a copolymer having a C2 content of the polyolefin portion from 3 to 50 wt %, and a C3 content from 50 to 97 wt %.

P11. The tire tread composition of any one of the preceding numbered paragraphs, wherein the number-average molecular weight ($M_n$) of the polyolefin portion is from 20,000 to 250,000 g/mole.

P12. The tire tread composition of any one of the preceding numbered paragraphs, wherein the vinyl/vinylidene-terminated polyolefin has a percent crystallinity of from 0% to 40%.

P13. The tire tread composition of any one of the preceding numbered paragraphs, wherein micelles comprising the functionalized polyolefin in the polymer matrix of the other components have sizes that are preferred to be less than 20 microns.

P14. An aminoalkylsilyl-functionalized polyolefin (PO-aminoalkyl-Si), an alkylsilane-functionalized polyolefin, or an alkoxysilane-functionalized polyolefin, wherein the polyolefin portion has a weight-average molecular weight (Mw) within the range from 500 to 300,000 g/mole.

P15. The functionalized polyolefin of paragraph 14, wherein the reaction product is from a vinyl/vinylidene-terminated polyolefin (VTP) and either a hydrosilylation reagent or an epoxidation reagent followed by treatment with an amine-containing silane reagent.

P16. The functionalized polyolefin of paragraph 15, wherein the functionalized polyolefin is represented by one of formulae:

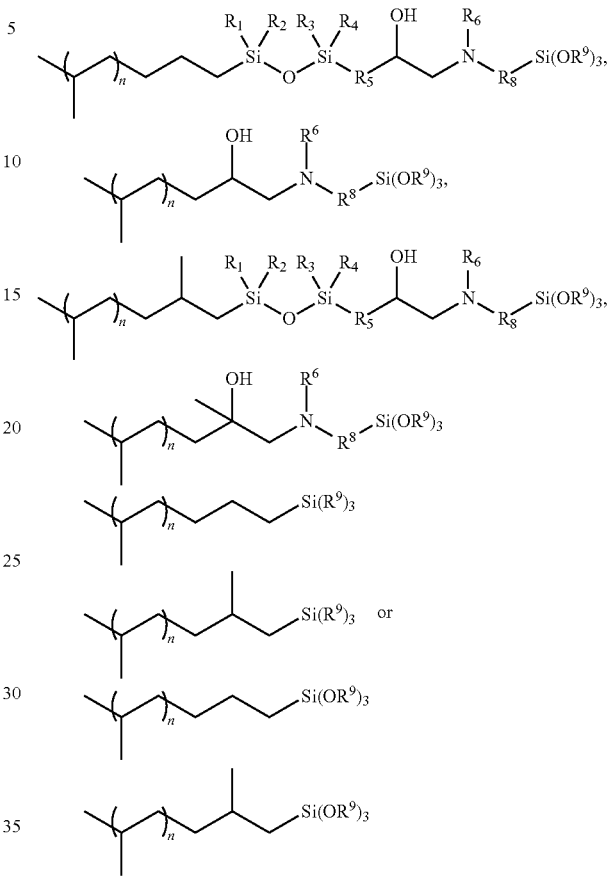

wherein n is from 50 to 11,000;
$R^1$, $R^2$, $R^3$ and $R^4$, if present, are each independently a C1 to a C10 substituted or unsubstituted branched or unbranched alkyl group or a C5 to a C18 substituted or unsubstituted aryl group;

$R^5$ and $R^8$, if present, are each independently a C1 to a C20 substituted or unsubstituted branched or unbranched alkylene group with or without heteroatoms such as oxygen and nitrogen, or a C5 to a C18 substituted or unsubstituted arylene group;

$R^6$, if present, is a hydrogen atom or a C1 to a C10 substituted or unsubstituted branched or unbranched alkyl group or a C5 to a C18 substituted or unsubstituted aryl group; and each $R^9$, if present, are independently a C1 to a C10 substituted or unsubstituted branched or unbranched alkyl group or a C5 to a C18 substituted or unsubstituted aryl group.

P17. The functionalized polyolefin of paragraph 16, wherein the functional group is derived from an epoxide, an organosilane, an organosiloxane, an epoxy-siloxane, an aminoalkylalkoxysilane, or a (3-glycidoxypropyl)-tetraalkyldisiloxane.

P18. A tire tread comprising the composition or functionalized polyolefin of any one of preceding numbered paragraphs.

P19. A method of balancing the wet traction performance and rolling resistance in a tire tread composition or tire tread of any one of the previously numbered paragraphs, comprising:

combining at least a filler, a diene-elastomer, and a curative agent with a functionalized polyolefin to form a tire tread; wherein the functionalized polyolefin is selected from the group consisting of structures:

wherein the functionalized polyolefin is selected and/or added in an amount that increases hysteresis in the wet traction region (0° C.) while lowering hysteresis in the rolling resistance region (60° C.) without changing the overall compound Tg by any more than 10% or 15% of its original value.

For all jurisdictions in which the doctrine of "incorporation by reference" applies, all of the test methods, patent publications, patents and reference articles are hereby incorporated by reference either in their entirety or for the relevant portion for which they are referenced.

What is claimed is:

1. A tire tread composition comprising the reaction product of components, by weight of the composition, within the range from:
   5 to 75 wt % of a diene elastomer;
   20 to 80 wt % of filler;
   a curative agent; and
   5 to 30 wt % of an aminoalkylsilyl-functionalized polyolefin (PO-aminoalkyl-Si), an alkylsilane-functionalized polyolefin or an alkoxysilane-functionalized polyolefin, or a blend thereof, each having a polyolefin portion and a functional group attached thereto.

2. The tire tread composition of claim 1, wherein the PO-aminoalkyl-Si is a reaction product of an epoxidized vinyl/vinylidene-terminated polyolefin and aft any one or mixture of an aminoalkylalkoxysilane, an alkylsilane-treated vinyl/vinylidene-terminated polyolefin, or an alkoxysilane-treated vinyl/vinylidene-terminated polyolefin.

3. The tire tread composition of claim 1, wherein the filler is a silica-based filler.

4. The tire tread composition of claim 2, wherein the reaction product of an epoxidized vinyl/vinylidene-terminated polyolefin and an aminoalkylalkoxysilane is represented by the formulae

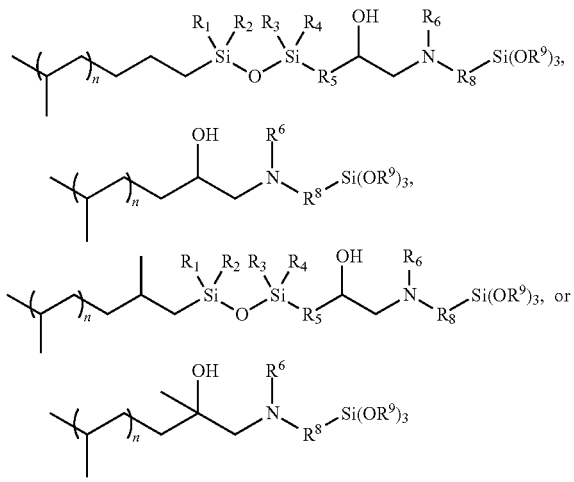

wherein n is from 50 to 11,000;
$R^1$, $R^2$, $R^3$ and $R^4$ are each independently a C1 to a C10 substituted or unsubstituted branched or unbranched alkyl group or a C5 to a C18 substituted or unsubstituted aryl group;

$R^5$ and $R^8$ are each independently a C1 to a C20 substituted or unsubstituted branched or unbranched alkylene group with or without heteroatoms;

$R^6$ is a hydrogen atom or a C1 to a C10 substituted or unsubstituted branched or unbranched alkyl group or a C5 to a C18 substituted or unsubstituted aryl group; and each $R^9$, independently, are a C1 to a C10 substituted or unsubstituted branched or unbranched alkyl group or a C5 to a C18 substituted or unsubstituted aryl group.

5. The tire tread composition of claim 1, wherein aminoalkylsilyl-functionalized polyolefin (PO-aminoalkyl-Si), an alkylsilane-functionalized polyolefin or an alkoxysilane-functionalized polyolefin is the reaction product formed by combining a trialkylsilane and the vinyl/vinylidene-terminated polyolefin, the reaction product represented by one of the formulae:

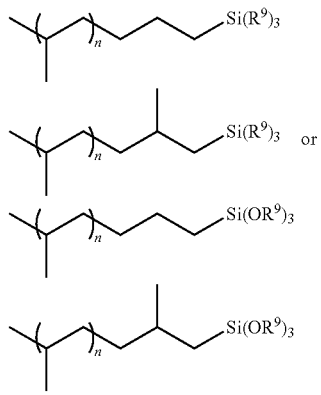

wherein n is from 50 to 11,000; and
each $R^9$, independently, is a C1 to a C10 substituted or unsubstituted branched or unbranched alkyl group or a C5 to a C18 substituted or unsubstituted aryl group.

6. The tire tread composition of claim 1, wherein the diene elastomer is selected from the group consisting of a styrenic copolymer, a polybutadiene, natural rubber, a polyisoprene, a butadiene copolymer, an isoprene copolymer, and blends thereof.

7. The tire tread composition of claim 1, wherein the polyolefin portion is an ethylene-propylene copolymer.

8. The tire tread composition of claim 1, wherein the polyolefin portion is a copolymer having a C2 content of the polyolefin portion from 3 to 50 wt %, and a C3 content from 50 to 97 wt %.

9. The tire tread composition of claim 1, wherein the number-average molecular weight ($M_n$) of the polyolefin portion is from 200 to 100,000 g/mole.

10. The tire tread composition of claim 1, wherein the polyolefin portion has a percent crystallinity of from 0% to 40%.

* * * * *